United States Patent [19]
Sadykhov et al.

[11] Patent Number: 5,624,530
[45] Date of Patent: Apr. 29, 1997

[54] SPRAY DRYING SYSTEM

[75] Inventors: Akper Sadykhov; Raphael Semiat, both of Haifa, Israel

[73] Assignee: Ultrasonic Dryer, Ltd., Haifa, Israel

[21] Appl. No.: 230,696

[22] Filed: Apr. 21, 1994

[30] Foreign Application Priority Data

May 11, 1993 [IL] Israel ......................... 105658

[51] Int. Cl.$^6$ ................ B01D 1/16; B01D 3/42
[52] U.S. Cl. ............... 159/3; 159/23; 159/44; 159/48.1; 159/900; 159/DIG. 16; 159/DIG. 32; 202/160; 202/182; 202/205; 202/236; 202/235; 239/589.1
[58] Field of Search ............ 159/DIG. 16, 48.1, 159/DIG. 32, 3, 44, 23, 900, DIG. 10, 27.2; 203/90, 2, 1, 91, DIG. 18; 239/589.1; 202/160, 236, 182, 205, 235; 34/72–74, 92

[56] References Cited

U.S. PATENT DOCUMENTS

| | | | |
|---|---|---|---|
| 3,620,776 | 11/1971 | Miskin et al. ........... | 159/48.1 |
| 3,922,189 | 11/1975 | Penders ................ | 159/48.1 |
| 4,052,255 | 10/1977 | Hackbarth et al. ....... | 159/4.01 |
| 4,141,783 | 2/1979 | Pisecky et al. ......... | 159/45 |
| 4,344,976 | 8/1982 | Bladh .................. | 159/28.5 |
| 4,412,653 | 11/1983 | Bresowar et al. ........ | 261/DIG. 48 |
| 4,421,594 | 12/1983 | Bildjukevich et al. .... | 159/48.1 |
| 4,943,007 | 7/1990 | Bowe et al. ............ | 261/115 |
| 5,015,382 | 5/1991 | Iwaya et al. ........... | 159/48.1 |
| 5,096,538 | 3/1992 | Naitoh ................. | 159/DIG. 16 |
| 5,306,412 | 4/1994 | Whitehouse et al. ...... | 204/180.1 |

FOREIGN PATENT DOCUMENTS

| | | | |
|---|---|---|---|
| 0972367 | 1/1951 | France ............... | 159/48.1 |
| 3409815 | 9/1985 | Germany . | |
| 5813634 | of 1981 | Japan . | |
| 978934 | 12/1982 | U.S.S.R. . | |
| 0872334 | 7/1961 | United Kingdom ...... | 159/48.1 |
| 8801540 | 3/1988 | WIPO . | |

OTHER PUBLICATIONS

"Atomization and Spray Drying", W.R. Marshall, Published by American Institute of Chemical Engineers, 1954.
"Ceramic Monographs", A Handbook of Ceramics, Verlag Schmid GmbH, 1980.
Patent Abstracts of Japan, vol. 7, No. 114(C–166)(1259) 18 May 1983.
Chemical Engineering, vol. 68, 4 Sep. 1961, NY, pp. 84–86.
European Search Report dated 8 Sep. 1994.

*Primary Examiner*—Virginia Manoharan
*Attorney, Agent, or Firm*—Wigman, Cohen, Leitner & Myers, P.C.

[57] ABSTRACT

Spray drying system for drying a liquid feed which is made up of a solution or suspension of particles in a fluid medium. The system enables the spray drying of wet material and converting the material into powder by evaporation of a liquid medium at reduced pressure or at a vacuum. The system includes a heating chamber and an evacuation device, communicating with the interior of the heating chamber. This provision enables creation of reduced pressure within the chamber, accompanied by evaporation of the fluid medium at temperatures lower than needed for evaporation at normal pressure, and evacuation of the moisture vapor generated during evaporation.

9 Claims, 4 Drawing Sheets

SPRAY DRYING SYSTEM

FIELD OF THE INVENTION

The present invention relates to chemical processing equipment, in particular, to systems for converting into a uniform powder a liquid feed which consists of a solution or suspension of particles in a fluid medium.

More particularly, the invention relates to so-called spray drying systems for drying by evaporation of a fluid medium from the liquid feed, after the feed is atomized and converted to the form of a cloud of fine droplets with a large exposed surface. During evaporation the fluid medium becomes a vapor which is evacuated from the system; the particles which have been separated from the fluid medium fall from the cloud in the form of a powder which can be collected from the system.

BACKGROUND OF THE INVENTION

Chemical processing plants for the drying of a liquid feed by means of its spraying and evaporation have been known and successfully practiced in special applications, particularly for the preparation of aluminous porcelains, since the last quarter of the nineteenth century.

Since the beginning of the twentieth century extensive application of the spray drying process in a wide variety of industries has been evident, e.g., in drying milk, soaps, detergents, pharmaceuticals, organic and inorganic chemicals, etc.

There are many known engineering monographs describing this process and its peculiarities with respect to the spraying equipment design. An example is W. R. Marshall's *Atomization and Spray Drying*, published by the American Institute of Chemical Engineers, 1954, or *Ceramic Monographs—Handbook of Ceramics*, 1980 Verlag Schmid GmbH.

The basic principles of the spray drying process include preparation of the liquid feed, which is then atomized into a spray. This spray, presented as a cloud of fine droplets, is projected into a stream of a hot gas which is contained within a cylindrical chamber with a conical or flat base. Drying by evaporation from the large exposed surface of the spray is rapid, and the vapor driven off is extracted from the chamber by means of cyclones, wet scrubbers or other appropriate equipment. The drying process is terminated when moisture content in the dried particles is reduced to the desired value and the particulated product is discharged from the chamber.

One of the additional advantages of spray drying systems is associated with their versatility in that they operate both in a continuous cycle without interruption as long as wet feed is supplied, as well as in a batchwise manner if so desired.

The main disadvantage of spray drying equipment implementing the transfer of heat energy to liquid feed by means of direct contact with hot gas is associated with the fact that it is usually suitable only for those materials which are not heat sensitive or readily oxidized, like minerals, inorganic oxides, bentonite, calcite, etc. For some materials, like some foodstuffs, pharmaceuticals, penicillin, blood plasma, and many others, this way of heat transfer is unsuitable, and spray dryers which employ hot gases or other means that come in direct contact with the dried feed, cannot be utilized.

It is common to dry heat sensitive or oxidizable materials by means of indirect batch dryers in which heat is transferred to the wet material via a retaining wall, and there is no contact between the vaporized liquid medium and heating medium. An example of these dryers is the so-called agitated pan dryer which operates atmospherically or under a vacuum, and usually handles only small amounts of nearly any wet solid, that is, liquids, slurries, pastes, etc.

Another common type of indirect dryer suitable for processing heat sensitive materials is the freeze dryer in which wet material is frozen prior to drying. Since it is necessary to maintain a very high vacuum when drying in the frozen state, freeze dryers are rather expensive installations due to the complex and sophisticated vacuum systems which they employed. Use of this type of dryer is, in most cases, limited to pharmaceuticals, fine chemicals and other related products which cannot be dried by any other means.

Another type of indirect dryer which is applicable for heat sensitive materials is the vacuum rotary dryer or vacuum shelf dryer. In vacuum rotary dryers the wet material is agitated in a horizontal stationary shell, the vacuum not always being necessary. In vacuum shelf dryers there is no agitation; the wet material is heated by contact with steam-heated or hot water-heated shelves on which the material lies.

The main disadvantage of indirect dryers is their basically reduced efficiency in terms of output which is associated with the batch mode of operation. Because of the long holdup required for internal diffusion of heat or moisture, a long heating cycle is necessary for achieving the desired moisture content.

There is also known method of producing a thermoreactive resin moulding material which is described in the Japanese laid-open patent application (Kokai) No. 58-13634 assigned to Matsushita Denki Co., Ltd. This method includes the step of spraying water-soluted urea resin syrup under low pressure with the simultaneous dehydration by heating of the condensation polymer. The drying system implementing this method includes a dehydrator in which the preheated syrup is sprayed by nozzle, and evaporates by virtue of the heat, supplied to the interior of the dehydrator via its walls. The moisture and solutes are evacuated from the dehydrator by a vacuum pump, leaving the dried urea resin which is collected in the lower part of the dehydrator in the form of particles.

Moisture and solutes are evacuated via an outlet port supplied in the side wall of the dehydrator in the vicinity of the spraying nozzle. The disposition of the outlet opening for evacuated moisture close to the spraying nozzle might be associated with certain limitations upon the relationship between the velocity submitted by the spraying nozzle to the atomized feed and the velocity submitted by the vacuum pump to driven-off solutes.

If the velocity of particles moving together with the sprayed feed via the heating zone towards the lower part of the dehydrator is too slow, or the velocity of the driven-off solute is too fast, the major part of the feed might be driven off by the pump from the dehydrator before the drying process has been completed. This situation might arise, e.g., when the feed is atomized into very fine particles by the ultrasonic nozzle, since the ultrasonically atomized spray moves with a velocity of several tenths cm per second, while the solute, driven off by the vacuum pump, moves with velocities faster by an order of magnitude.

This assumption is supported by the indication which can be found in this application, that the final product collected in the bottom of the dehydrator consists of relatively coarse, 60 mesh particle size, particles. It should therefore be concluded that the drying system disclosed in the Japanese application inevitably becomes limited to only a certain type of atomizing means and therefore to a particular size of final product, ensuring the optimal ratio between velocities of sprayed feed and driven-off solute.

SUMMARY OF THE INVENTION

The object of the present invention is to provide a spray drying system in which the above-mentioned drawbacks are sufficiently reduced or overcome.

In particular, the first object of the present invention is to provide a system for drying wet material, which constitutes a solid phase distributed in a fluid medium by means of evaporation of said medium at reduced pressure or at vacuum so as to achieve the possibility of drying heat-sensitive or readily-oxidizable materials at lower temperatures than those needed for evaporation of fluid medium at normal pressure, thus preventing deterioration of their properties.

The second object of the present invention is to provide a spray drying system which operates with increased efficiency in drying and reduced moisture content in the final product.

A further object of the present invention is to provide a spray drying system which has simple construction and is therefore reliable and easy to maintain.

Still another object of the present invention is to provide a spray drying system which functions without being limited by the type of atomizing means and/or by the particle size of the final dried product.

Yet another object of the present invention is to provide a spray drying system which operates at reduced pressure, or at vacuum and employs an ultrasonic atomizing means.

Still a further object of the present invention is to provide a spray drying system which is suitable for drying the wet materials presented in different initial condition, i.e., solution, suspension, dispersion, paste, slurry, sludge, or the like.

These and other objects and advantages of the present invention can be achieved in accordance with the following combination of its essential features as presented below.

A system for drying wet material constituting a solid phase, distributed in a fluid medium by means of evaporation of said medium, said system comprising:

- a feeding means adapted to supply said material in liquid state into the system, e.g., in the form of a solution, suspension, dispersion, or prepared from a paste, slurry, sludge, or the like,
- an atomization means adapted to spray the supplied liquid material so as to convert its initial state into a mist consisting of a plurality of droplets,
- a substantially indirectly heated heating chamber adapted to evaporate the fluid medium from said mist of droplets generated by said means of atomization,
- a product recovery and collecting means adapted to collect the solid particles of the final product, produced from said wet material and to recover said fluid medium from its evaporated state,
- a display and control means provided with the appropriate sensors and instrumentation so as to control process variables and
- An evacuation means communicating with interior of said heating chamber, adapted to maintain reduced pressure in the interior of said heating chamber so as to evaporate said fluid medium at temperatures lower than needed for its evaporation at normal pressure, and to evacuate, away from the heating chamber, the moisture vapour generated during evaporation of said fluid media, characterized in that,

- said heating chamber is formed as an elongated compartment provided with side walls which extend along the longitudinal axis of the chamber and top and bottom extremities, defining the interior of said chamber,
- said atomization means is mounted adjacent to top extremity of said chamber,
- said collecting means mounted adjacent to bottom extremity of said chamber, and said evacuation means communicates with the interior of said heating chamber via said collecting and recovery means.

According to one of the preferred embodiments, said atomization means is formed as an ultrasonic oscillator which consists of a nozzle connected to the generator of ultrasonic vibrations; said nozzle is provided with an elongated horn portion which submits vibratory motion at the free end, thereby to the liquid material supplied by said feeding means.

According to still another preferred embodiment said nozzle is mounted at the top extremity of said heating chamber, said elongated horn portion being oriented substantially parallel to the longitudinal axis of the heating chamber.

In yet another preferred embodiment said feeding means supplies the liquid material from the outside to the free end of said horn portion.

In another preferred embodiment said feeding means supplies the liquid material via said nozzle to the free end of said horn portion.

According to still another preferred embodiment said recovery means comprises a wet scrubber or condenser, said collecting means is formed as a collecting bag or cyclone system, and said evacuation means is formed as a vacuum-producing device, e.g., a vacuum pump.

In addition, in another preferred embodiment said system is provided with a vapor sweeping means formed as a tubular element mounted inside said heating chamber, extending along the longitudinal axis of said chamber, said hollow tubular element being provided with a plurality of openings so as to ensure communication of the interior of said element with the interior of said chamber, said sweeping means being connected with said evacuation means.

In accordance with one of the other preferred embodiments, the system is provided with an additional collecting and recovery means and said vapor sweeping is connected with said evacuation means via said additional collecting and recovery means.

In accordance with a further preferred embodiment, said vapour sweeping means is formed with a plurality of shields, mounted on the outwardly facing surface of said means in the vicinity of said openings so as to provide a separation of particles of the final product from the vapor generated during evaporation and driven off by said sweeping means via said openings.

The present invention in its various embodiments has only been briefly summarized. For a better understanding of this invention, as well as of its advantages achieved by virtue of the above-mentioned embodiments, reference will now be made to the following description which is taken in combination with accompanying drawings.

DESCRIPTION OF THE PREFERRED EMBODIMENTS

Figure 1A:
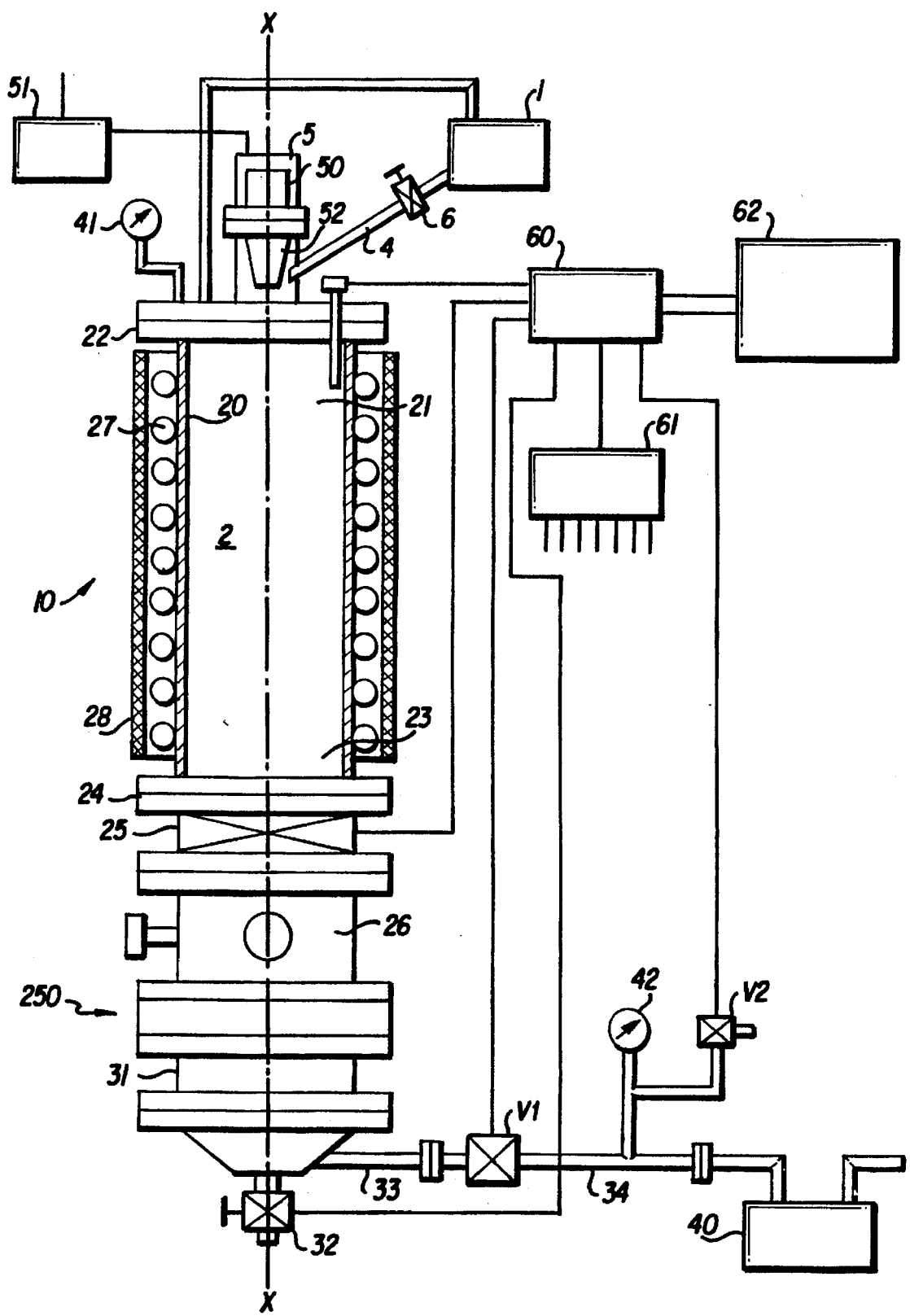
FIG. 1a is a general schematic view of the spray drying system showing its main components and a block-diagram illustrating its functions.

With reference to FIG. 1a the system comprises feeding means 1, which supplies liquid material into interior 2 of the heating chamber 10 in which evaporation of the liquid takes place. The feeding means is substantially formed as a closed container equipped with a pump (not shown) for direct supply of the feed to the heating chamber through the appropriate piping line or to atomization means 5 by gravitation via a slanted pipe line 4.

It might be advantageous to provide the feeding means 1 with the appropriate heating or cooling device and/or agitator so as to control the temperature inside the container and to adjust viscosity of the feed before it is supplied to the chamber. By virtue of such an arrangement better atomization might be ensured, as well as the possibility for drying materials with various initial physical conditions, e.g., solutions, suspensions, dispersions, pastes, sludges, slurries, etc. Piping line 4 might be provided with a regulating valve 6, mounted adjacent to the outlet opening of the container so as to enable control of the feed rate to the liquid material being supplied to atomization means 5.

Liquid material after it is atomized is dried inside the main heating chamber 10, which is preferably formed as a cylinder with longitudinal axis X—X. The hollow interior 2 of the chamber is defined by inner wall 20, upper flange 22 and lower flange 24.

The interior of the heating chamber is divided into the upper extremity 21, situated adjacent to the atomization means 5, central heating zone and lower extremity 23, which communicates via sliding gate 25 with dry collecting means 26. The heating chamber is provided with heating elements, preferably formed as a spiral 27, coiled around the outwardly facing surface of cylindrical wall 20. The heating elements are connected with the appropriate power supply (not shown) so as to provide indirect heating of dried material inside the heating chamber by means of heat transfer via chamber wall 20.

It is preferable to arrange heating elements along the entire length of the cylindrical wall of the chamber and divide them into groups so as to provide independent local heating of different zones of the heating chamber along its longitudinal axis X—X. An insulation layer 28 closes heating spiral 27 so as to prevent loss of heat to the outside.

It should be understood that instead of spiral heating elements, an alternative means, suitable for indirect heating, can be provided, e.g., infrared heaters, steam-heated jacket, etc.

The inner wall of the heating chamber is made from appropriate heat-resistant material, e.g., stainless steel, glass, refractory ceramic or their combination.

The atomizing means 5, employed in the drying system, according to the present invention, is preferably formed as an ultrasonic oscillator 50 which is connected to a generator of ultrasonic vibrations 51. It is preferably that the oscillator be joined with a nozzle tip.

By virtue of ultrasonic vibrations submitted to the liquid feed by the nozzle, the feed, which was initially presented in continuous liquid form, becomes a spray which consists of a plurality of tiny discrete droplets constituting a mist, characterized by a very large surface.

Oscillator 50 is provided with an elongated horn portion 52 which submits a vibratory motion at its free end 58 to the liquid material supplied to the nozzle by said feeding means. FIG. 1a shows the supply of liquid feed to the free end of the nozzle from the outside container by means of piping line 4; however, it should be understood that the feed can be supplied to the free end of the horn portion via the through-going passageway formed in the oscillator itself as well.

Oscillator 50 can also be provided with an appropriate polarization means which submits an electrostatic charge to the spray droplets, thus enabling better control of spray pattern geometry.

Arrangement of polarization means as well as appropriate means for its control can be carried out according to known techniques e.g., as described in Rudenko's Russian patent SU 978934 or PCT application US87/02159.

Figure 2A:
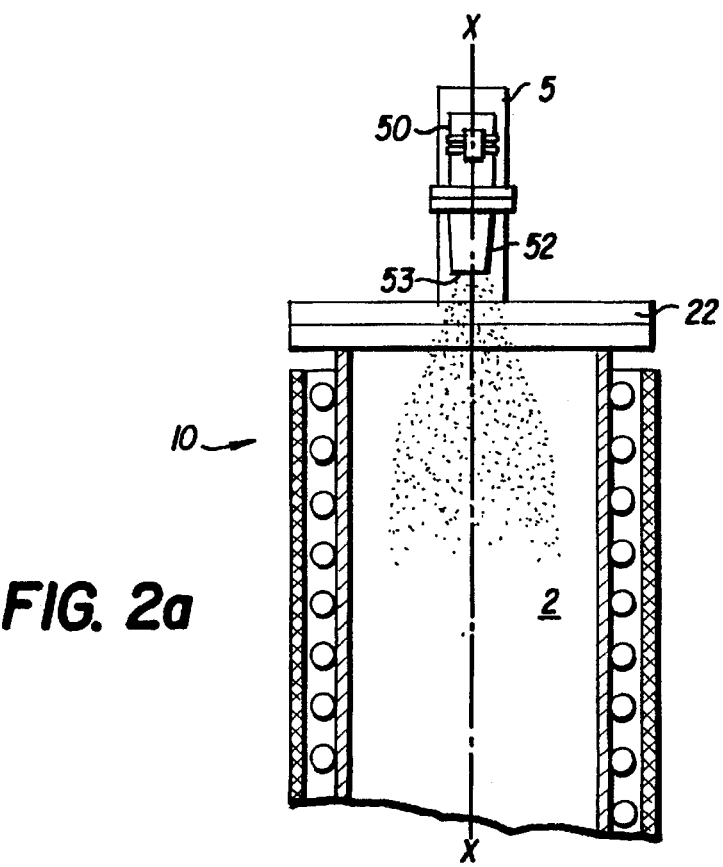
FIGS. 2a,b show a different disposition of the atomizing means with respect to the longitudinal axis of the heating chamber.

FIGS. 1a and 2a show the coaxial disposition of the spray nozzle 50 with respect to the longitudinal axis X—X. By virtue of this disposition the geometric spray pattern achieved is schematically shown by the dotted lines in FIG. 2a.

Figure 2B:
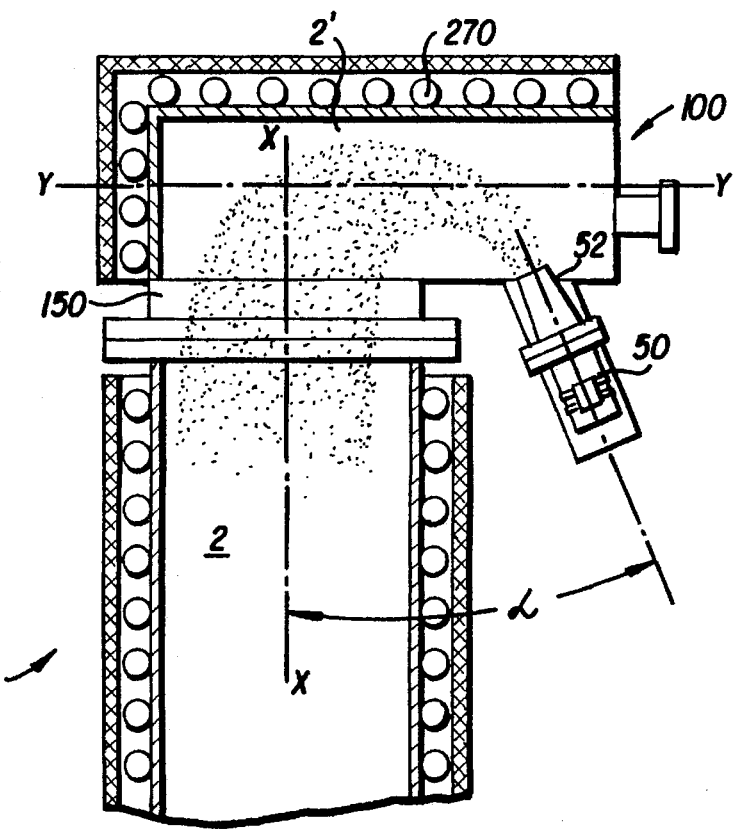
Figure 3:
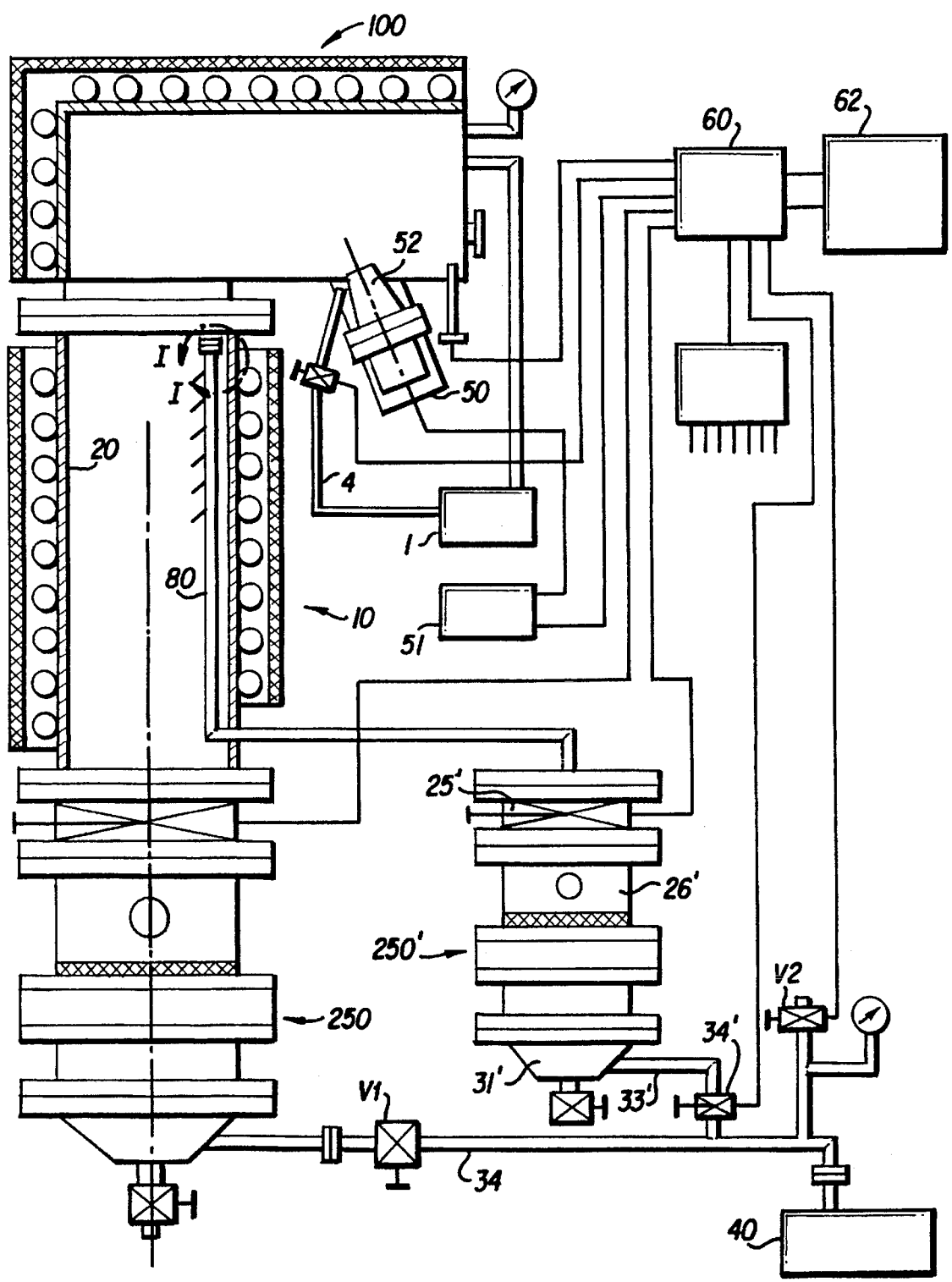
FIG. 3 presents a diagrammatic view of the spray drying system equipped with moisture vapor sweeping means and an additional collection and recovery means.

It might be advantageous if the nozzle disposition is chosen as in FIGS. 2b and 3. In accordance with this arrangement oscillator 50 is situated inside the auxiliary heating compartment 100 located at the upper end of the main heating chamber 10. Compartment 100 extends radially with respect to the main heating chamber; its interior 2' communicates with the interior 2 of the main heating chamber by means of neck portion 150.

The auxiliary compartment 100 might be provided with heating elements 270 mounted outside its interior 2' so as to enable indirect initial heating of the atomized spray, before it reaches heating chamber 10.

As can be seen in FIG. 2b, oscillator 50 is slanted with respect to the longitudinal axis X—X of the main heating chamber in the sense that the elongated horn portion 52 of the nozzle tip defines a certain acute angle $\alpha$ with this axis.

The spray coming out of the ultrasonic oscillator is atomized into fine droplets, their size varying between 10 and 100 microns depending on the power supplied by the generator to the oscillator.

This spray enters the auxiliary heating compartment and after that proceeds downward into the main heating chamber. The geometry of the spray associated with this arrangement is shown by the dotted lines in FIG. 2b. It can be easily understood that by changing the angle $\alpha$, this geometry can be varied so as to ensure the most efficient spraying of feeds, the initial liquid condition of which is characterized by different viscosities.

It should be also understood that ultrasonic oscillation is not the only suitable method for atomizing liquid feed; alternative embodiments of the atomizing means can be employed in the drying system according to the present invention, e.g., a spinning disc centrifugal atomizer. The method of employing two fluid spray atomizers can be used as well.

Atomized spray in the form of a mist is heated inside the heating chamber, and the fluid media is evaporated from the mist droplets while the dried solid particles of the final product, with desired residual moisture, fall down from the mist towards the bottom extremity 23 of the heating chamber. They are discharged with the collecting means 26, situated adjacent to the bottom extremity of the heating chamber.

As can be seen, the collecting means is arranged at a considerable distance from the atomizing means so as to ensure sufficient residence time for the product moving from the heating zone to discharge zone.

As a suitable collecting means, one can use a removable fabric bag filter arranged on a bag house (not shown), cyclone filter or their combination. To enable removal of the full bag from the housing and discharge of the collected powder, sliding gate 25 is closed so as to evacuate interior 2 of the heating chamber from the collecting means.

The fluid media evaporated from the liquid material is driven off by virtue of an appropriate evacuation means as will be explained later. This media, in the form of a hot moist vapor, proceeds via the collecting means 26 into the recovery means 31, where it is transferred back to the liquid state and can be taken out of the system via outlet valve 32 which is installed in the conical bottom part of the recovery means. It might be advantageous to combine components 25, 26 and 31 into one modular unit 250 which will enable both product collection and recovery of the liquid media.

A condenser with liquid cooling agent, or wet scrubber is an example of an appropriate recovery means which can be employed in the drying system, according to the present invention.

The bottom part of the recovery means is provided with outlet port 33, communicating via valve V1 and piping line 34 with evacuation means 40.

The purpose of evacuation means is twofold: to maintain reduced pressure inside the heating chamber and to exhaust the moisture vapor generated during evaporation of the fluid media, which was not recovered inside the recovery means.

Figure 1B:
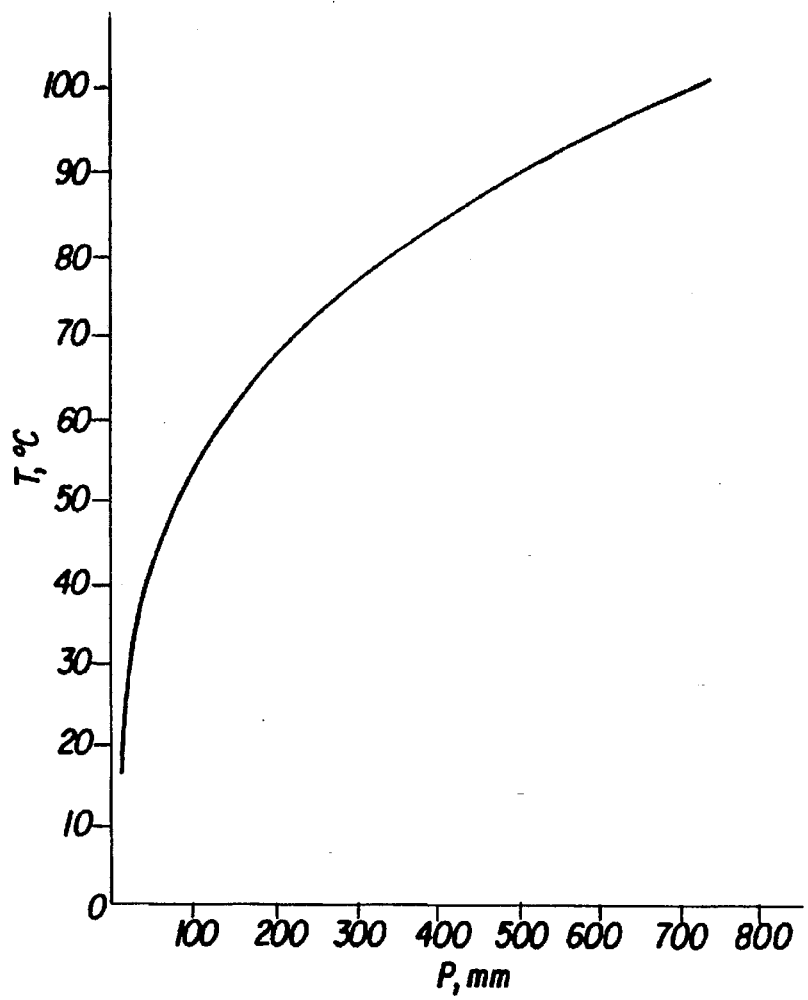
FIG. 1b shows a pressure-temperature relationship which corresponds to liquid-vapor equilibrium transition for water, implemented in the spray drying system, according to the present invention.

With reference to the diagram shown in FIG. 1b, it will now be explained how, by virtue of the reduced pressure maintained inside the heating chamber due to evacuation means 40, it is possible to evaporate the fluid media from the wet product at temperatures which are lower than would be needed to evaporate this media at normal pressure.

This diagram shows that water can be brought to boiling point at temperatures below 100° C., if the pressure of its vapor is less than standard atmospheric pressure of 760 torr. This well-known phenomena is known as liquid-vapor equilibria phase transition, and it is exhibited by many other liquids as well.

Liquid-vapor equilibria transition is implemented in the present invention, and by means of reduced pressure maintained in the chamber, drying heat sensitive materials becomes possible without deterioration of their properties, since evaporation of the liquid solvent takes place at reduced temperatures.

It has been empirically found that for drying of heat sensitive materials, employing water as a fluid media it would be preferable for maintaining reduced pressure, in the 20–150 torr range, in the heating chamber, and therefore to perform drying at temperatures below 25°–60° C., instead of 100° C.

For maintaining such a level of reduced pressure, very simple and compact equipment, such as vacuum pump or any other suitable mechanical pump, can be used. It should be pointed out that known drying systems which employ a vacuum, e.g., freeze drying, require a vacuum in the range of approximately 1–0.01 torr, which is associated, with necessity, to complex and expensive vacuum producing installations which demand a large amount of space.

Output capacity of evacuation means and level of reduced pressure inside the system can be adjusted by regulating valves V1,V2, installed correspondingly in piping line 34 and adjacent to pressure gauge 42.

In order to eliminate leaks and maintain the required level of reduced pressure in the system, all connections between the chamber and other components, as well as connections between the components themselves, should be properly gasketed and sealed.

Pressure gauge 41 is arranged in the upper flange of the chamber so as to enable measuring the level of reduced pressure maintained in the chamber; pressure gauge 42 checks the pressure in piping line 34.

Aside from the pressure gauges, the system has other relevant instrumentation which is required for its proper functioning, in particular, with contact thermometers and thermocouples for measuring temperatures in the feeding container, at the nozzle, in different zones of the heating chamber, and inside the collecting and recovery means.

Also provided is a computer control system 60 connected to outputs of all instrumentation items via interface 61. The computer system is also wired to the ultrasonic vibrations generator 51, the regulating valves V1, V2 and with the central instrument display panel 62, which is equipped with a switchboard, enabling coordinated control of the functioning of the system components.

In accordance with the present invention, the system has been successfully employed for drying different kinds of heat-sensitive materials, in particular a pasty foodstuff with moisture content of 60–80%, a liquid detergent, and an emulsion of an organic adhesive. The feed in its initial liquid state was supplied from a container, the temperature of which was 20°–30° C.; feed rate was in the range of 5–10 l/h. The feed was atomized, by means of an ultrasonic oscillator with nozzle tip, into fine droplets with a diameter of 30–70 microns and dried at a reduced pressure of 100 torr at 50° C. The pump output of 10 l/sec was enough to maintain the required level of reduced pressure. After several fractions of a second of drying time, the dried product, in powder form, at 10 microns particle size and with negligible residual moisture content, was collected in the bag collector.

Figure 4A:
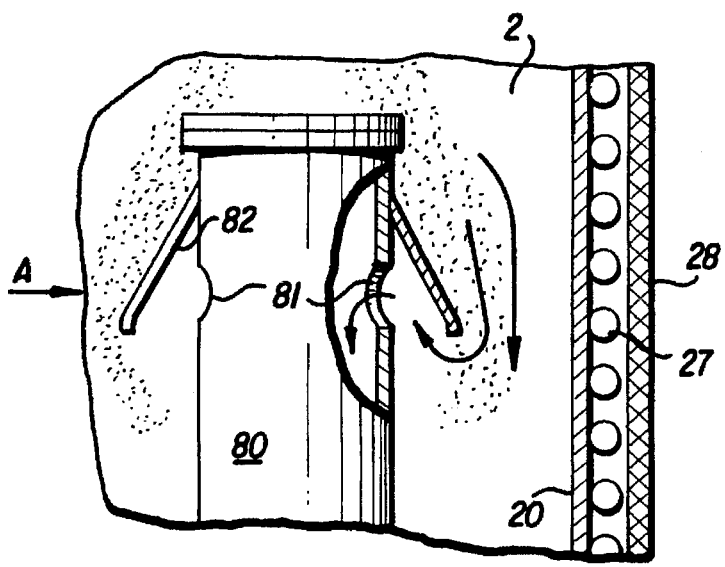
FIGS. 4a,b show an enlarged view of detail I encircled in FIG. 3 and enlarged partial view of the vapor sweeping means shown in FIG. 3.
Figure 4B:
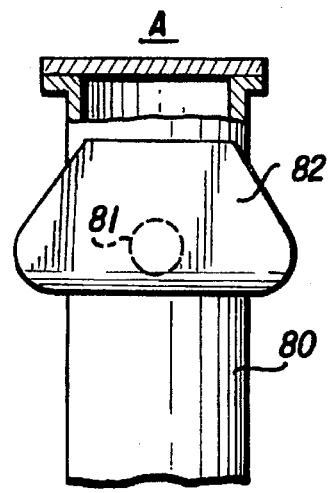

With reference to FIGS. 3, 4, an additional embodiment of the present invention will now be explained. As can be seen, this embodiment comprises basically similar components.

The feed is supplied from container 1 by means of a feed pump (not shown) via piping line 4, directly towards the horn portion of the ultrasonic oscillator 50, which receives ultrasonic vibrations from the generator 51. The atomized spray is accelerated by the nozzle, enters the auxiliary heating compartment 100 and then proceeds further into the heating chamber 10. The bottom portion of the chamber communicates via the sliding gate with collecting and recovery means. An evacuation means 40 maintains the required level of reduced pressure inside the chamber. The vapour generated during evaporation of the fluid media is exhausted from the bottom extremity of the chamber by virtue of the same evacuation means 40, driving it off via piping line 34.

At least one hollow tubular element 80 is mounted close to the cylindrical wall 20 of the heating chamber. As shown in FIG. 4a it is substantially formed as a closed tube extending along the wall and provided with a plurality of openings 81, which enable communication of the interior of the heating chamber with the interior of the tube. The tube is manufactured from a heat resistant material capable of withstanding working temperatures, developed in the heating chamber and extending outside of the chamber via the appropriate outlet port, arranged adjacent to the bottom extremity 23 of the chamber. The outside end of the tube is connected with a collecting and recovery modular unit 250', formed similarly to modular unit 250 and comprising sliding gate 25', collecting means 26', and condenser 31'. The outlet port 33' connects unit 250' with evacuation means 40 via regulating valve 34' and piping line 34 so as to provide reduced pressure inside the tubular element, sweeping off part of the vapor generated during evaporation of the spray.

The purpose of the openings in the tubular element is to arrange for sweeping off of the vapor in a tangential direction along the entire length of the drying chamber.

The size and geometry of these openings as well as the cross-sectional configuration of the tubular element is chosen so as to ensure efficient driving off of the vapor produced at every step of the drying process and in every zone of the chamber.

By virtue of the above tubular element which provides a sweeping of the vapor in tangential direction, the main part of the vapor, moving in longitudinal direction and driven off via the bottom part of the chamber, moves more slowly, and therefore it becomes possible to increase residence time of material in the drying chamber and to ensure achieving the desired residual moisture content.

The other advantage associated with providing of the heating chamber with a sweeping means is the possibility of controlling the length of the central hot zone more efficiently in accordance with the properties of the particular material dried in the system.

In order to increase the efficiency of the sweeping action, it might be advantageous to provider the system with several tubular elements distributed along the inner wall of the heating chamber and arranged in a jacket which is connected to a vacuum pump via an additional collecting and recovery means.

The regulating valve 34' is connected with the control means 60 so as to provide coordinated functioning of sweeping means 80 with additional components of the drying system.

As shown in FIGS. 4a,b the tubular elements 80 might be provided with shields 82, mounted adjacent to openings 81. The purpose of these shields is to direct the driven-off vapor along the trajectory shown by arrows in FIG. 4a towards openings 81, and to ensure that most of the dried particles become separated from the vapor and move towards the bottom extremity of the heating chamber.

By virtue of the above described system, efficient drying of a wide range of heat sensitive materials is ensured, at reduced temperatures, without deterioration of the properties of the dried product and up to a desired residual moisture.

It should be understood that the present invention should not be limited to the above preferred embodiments and that changes and modifications can be made by one ordinarily skilled in the art, without deviation of the scope of the invention, as well be defined below in the appended claims.

We claim:

1. A system for drying wet material constituting a solid phase distributed in a fluid medium by means of evaporation of said medium, said system comprising:

a feeding means for supplying said material in liquid state into the system, the liquid state selected from the group of states consisting of a solution, suspension, dispersion, paste, slurry, and a sludge, a means for atomizing by spraying the supplied liquid material so as to convert its initial state into a mist consisting of a plurality of droplets, a heating chamber provided with heating means for indirect heating of the interior thereof so as to evaporate the fluid medium from said mist of droplets generated by said means for atomizing, a product recovery and collecting means for collecting the solid particles of the final dried product, produced from said wet material, and for recovering said fluid medium from its evaporated state, a display and control means provided with sensors and instrumentation for controlling process variables, and an evacuation means, communicating with the interior of said heating chamber, for maintaining reduced pressure in the interior of said heating chamber so as to evaporate said fluid medium at temperatures lower than needed for its evaporation at normal pressure and to evacuate, away from the heating chamber, the moisture vapor generated during evaporation of said fluid medium, wherein said heating chamber is defined by side walls which extend along the longitudinal axis of the chamber and top and bottom extremities of the chamber, said atomizing means is mounted adjacent to the top extremity of said chamber, said product recovery and collecting means mounted adjacent to the bottom extremity of said chamber, and said evacuation means communicates with the interior of said heating chamber via said product recovery and collecting means;

wherein said product recovery and collecting means comprises a recovery device selected from the group of devices consisting of a wet scrubber and a condenser, and a collection device formed as a member selected from the group of members consisting of a collecting bag and a cyclone system, and said evacuation means is formed as a vacuum pump;

and a vapor sweeping means formed as a hollow tubular element mounted inside said heating chamber, extending along the longitudinal axis of said chamber, said hollow tubular element being provided with a plurality of openings so as to ensure communication of the interior of said element with the interior of said chamber, said vapor sweeping means being connected with said evacuation means.

2. A system defined in claim 1, wherein said atomization means is formed as an ultrasonic oscillator comprising a nozzle tip connected to a generator of ultrasonic vibrations; said nozzle provided with an elongated horn portion which submits vibratory motion at the free end thereof to the liquid material supplied by said feeding means.

3. A system defined in claim 2, wherein said oscillator is mounted at the top extremity of said heating chamber, said elongated horn portion being oriented substantially parallel to the longitudinal axis of the heating chamber.

4. A system as defined in claim 2, further comprising an auxiliary heating compartment arranged radially with respect to the top extremity of said heating chamber, said oscillator being mounted substantially inside said auxiliary compartment and said elongated horn portion of said nozzle tip oriented not parallel to the longitudinal axis of the heating chamber.

5. A system as defined in claim 2, wherein said feeding means supplies the liquid material from the outside to the free end of said horn portion.

6. A system as defined in claim 2, wherein said feeding means supplies the liquid material via said oscillator to the free end of said horn portion.

7. A system as in claim 2, wherein said instrumentation for controlling process variables includes means for controlling temperature within said feeding means, within said atomizing means, within different zones of said heating chamber and within solid product recovery and collecting means, means for controlling pressure within said heating chamber and within a line for communicating interior of said heating chamber with said evacuation means, and means for controlling said ultrasonic oscillator.

8. A system as defined in claim 1, further comprising an additional collecting and recovery means; said vapor sweeping means being connected with said evacuation means via said additional collecting and recovery means.

9. A system as defined in claim 1, wherein said vapor sweeping means is formed with a plurality of shields, mounted on the outwardly facing surface of said means in the vicinity of said openings so as to provide a separation of particles of the final product from the vapor generated during evaporation and driven off by said sweeping means via said openings.

\* \* \* \* \*